United States Patent
Tamishetty et al.

(10) Patent No.: US 12,452,241 B2
(45) Date of Patent: Oct. 21, 2025

(54) AUTOMATED REMEDIATION OF A DEVICE THAT FAILED SECURE ONBOARDING

(71) Applicant: DELL PRODUCTS L.P., Round Rock, TX (US)

(72) Inventors: Ravinder Tamishetty, Singapore (SG); Shi Kai Khiew, Singapore (SG)

(73) Assignee: DELL PRODUCTS L.P., Round Rock, TX (US)

( * ) Notice: Subject to any disclaimer, the term of this patent is extended or adjusted under 35 U.S.C. 154(b) by 328 days.

(21) Appl. No.: 18/094,249

(22) Filed: Jan. 6, 2023

(65) Prior Publication Data

US 2024/0236090 A1 Jul. 11, 2024

(51) Int. Cl.
*H04L 9/40* (2022.01)
*H04L 41/0869* (2022.01)

(52) U.S. Cl.
CPC ...... *H04L 63/0876* (2013.01); *H04L 41/0869* (2013.01)

(58) Field of Classification Search
None
See application file for complete search history.

(56) References Cited

U.S. PATENT DOCUMENTS

| | | | | |
|---|---|---|---|---|
| 2018/0097640 | A1* | 4/2018 | Queralt | H04L 63/0815 |
| 2020/0336308 | A1* | 10/2020 | Deutschmann | H04L 9/088 |
| 2023/0199025 | A1* | 6/2023 | Xu | G06F 21/55 |
| | | | | 726/22 |
| 2024/0419771 | A1* | 12/2024 | Nussbaum | G06F 21/34 |

OTHER PUBLICATIONS

FIDO News Center, "FIDO Alliance Creates New Onboarding Standard To Secure Internet of Things (IoT)," [online], [Retrieved Apr. 19, 20249]. Retrieved from Internet <URL: https://fidoalliance.org/fido-alliance-creates-new-onboarding-standard-to-secure-internet-of-things-iot/> Apr. 20, 2021. (8pgs).

"FIDO Device Onboard Specification 1.1," fido Alliance, [online], [Retrieved Apr. 19, 2024]. Retrieved from Internet <URL: https://fidoalliance.org/specs/FDO/FIDO-Device-Onboard-PS-v1.1-20220419/FIDO-Device-Onboard-PS-v1.1-20220419.html> Apr. 19, 2022. (98pgs).

"FIDO Device Onboard Specification," fido Alliance, [Retrieved Apr. 19, 2024]. Retrieved from Internet <URL: https://fidoalliance.org/specs/FDO/FIDO-Device-Onboard-RD-v1.0-20201202.html> Dec. 2, 2020. (130 pgs).

"FIDO Device Onboard: A specification for automated, secure IOT provisioning technology," fido Alliance, 2021. (4pgs).

* cited by examiner

*Primary Examiner* — Scott B Christensen
(74) *Attorney, Agent, or Firm* — BAUGH LAW, LLC

(57) ABSTRACT

As part of deployment of a device, the device typically must be installed and configured, which may be referred to as "onboarding." Device onboarding typically involves installation of the physical device and setup of credentials so that it can securely communicate with its target cloud or platform. If the device is unable to successful connect with a rendezvous server, the onboarding process becomes blocked and cannot continue. Currently, there are no automated remediation mechanisms to fix a device so that it can complete secure onboarding. In one or more embodiments, a facilitator acts as an intermediary between a device agent and an owner service. The facilitator helps facilitate automatic resolution of issues that are inhibiting the device from completing secure device onboarding.

20 Claims, 12 Drawing Sheets

AUTOMATED REMEDIATION OF A DEVICE THAT FAILED SECURE ONBOARDING

BACKGROUND

A. Technical Field

The present disclosure relates generally to information handling systems. More particularly, the present disclosure relates to secure onboarding of information handling systems.

B. Background

The subject matter discussed in the background section shall not be assumed to be prior art merely as a result of its mention in this background section. Similarly, a problem mentioned in the background section or associated with the subject matter of the background section should not be assumed to have been previously recognized in the prior art. The subject matter in the background section merely represents different approaches, which in and of themselves may also be inventions.

As the value and use of information continues to increase, individuals and businesses seek additional ways to process and store information. One option available to users is information handling systems. An information handling system (or devices) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As the size, cost, and functionality of information handling devices have diversified, information handling devices are used in numerous places. While the proliferation of technology has made modern life easier and/or better, there are some associated issues. One such issue is related to security. Malicious actors may attempt to gain access to devices or to networks via compromised or rogue devices. Accordingly, security aspects have been developed, and continue to evolve, to help secure devices and networks.

The FIDO™ ("Fast IDentity Online") Alliance is an association formed by various businesses that seeks to develop strong authentication protocols to help reduce issues related to authentication and security. One such protocol—FDO Device Onboarding—is related to what is called "onboarding," in which a device is securely added to a network (or platform). Currently, the onboarding process is typically performed manually by a technician or administrator. As with many manual processes, it can be slow, costly, subject to errors, and insecure. Furthermore, with the proliferation of devices, such as in the case of internet of things (IoT) devices, manual processing become feasibly impractical. Thus, the FDO Device Onboarding specification is intended to automate the process of onboarding. While the FDO Device Onboarding process proposed by the FIDO™ Alliance is helpful in improving the onboarding process, there are problems.

In the existing FDO Secure Onboarding mechanism, there is a limitation when a device is unable to establish connection to any of the pre-configured "Rendezvous Servers (RV)" that are used as part of the onboarding process. The FDO Secure Onboarding process from the FIDO™ Alliance provides no automated remediation to complete the secure device onboarding without relying upon manual intervention.

Accordingly, it is highly desirable to develop systems and methods that can automatically identify and rectify issues that prevent completion of a secure onboarding process.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
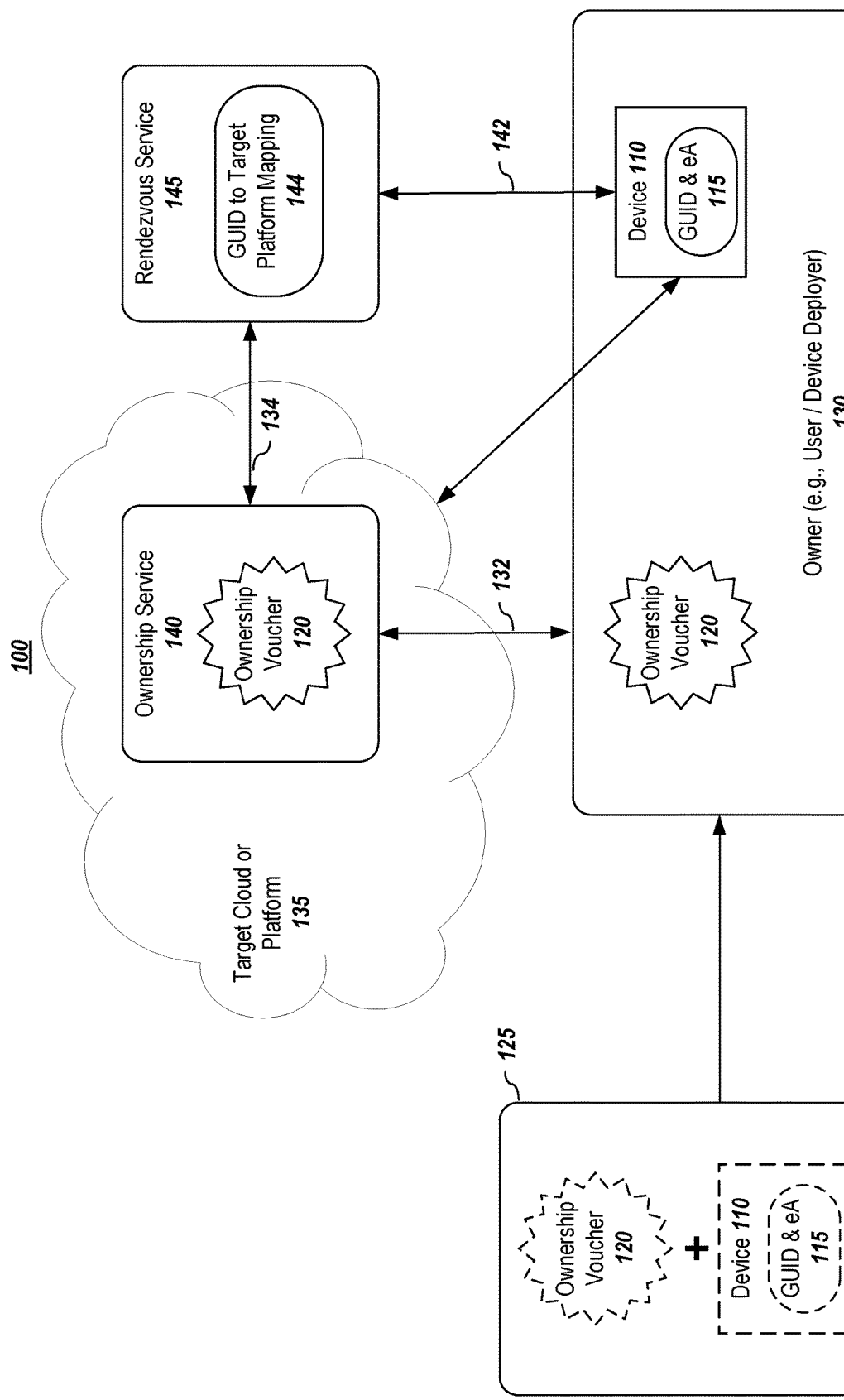
FIG. 1 depicts a set of stages or steps that are part of an onboarding process, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall also be noted that although embodiments described herein may be within the context of device onboarding within the context of FDO Secure Onboarding, aspects of the present disclosure are not so limited. Accordingly, the aspects of the present disclosure may be applied or adapted for use in other contexts.

A. General Overview

As noted above, the use of information handling systems (which may also be referred to herein as devices) has exploded over the last few years and appears to be growing. As part of the deployment of a device, the device typically must be installed and configured. The process of installing and configuring a device may be referred to as "onboarding." Device onboarding typically involves installation of the physical device and setup of credentials so that it can securely communicate with its target cloud or platform. FIDO Alliance developed a Secure Device Onboarding (SDO) process, which is known as the FDO specification.

FIG. 1 depicts a set of stages or steps that are part of a general onboarding process, according to embodiments of the present disclosure. The first stage, the manufacturing process 125, involves a manufacturer or original equipment manufacturer (OEM) building a device 110. The device 110 may include a client and a root of trust (RoT) key that to uniquely identifies the device. The RoT may or use a cryptographic key or keys built into a component of the device, such as a trusted platform module (TPM). In the depicted embodiment in FIG. 1, the device is configured to include a GUID (a globally unique identifier) and a device attestation key (eA) 115. It should be noted that one or more additional credentials may also be included with the device along with an addresses or addresses that will be used later as part of the onboarding process. Finally, a digital proof of ownership, which is depicted in FIG. 1 as the ownership voucher 120, is associated with the device. The ownership voucher 120 may be implemented as a self-protected digital document and is used by the owner (e.g., user/customer/device deployer 130) of the device to identify itself later in the onboarding process.

In one or more embodiments, the ownership voucher may comprise a number of fields with data used to identify the associated device. For example, in one or more embodiments, an ownership voucher header may comprise the following (it should be noted that fewer or additional fields and data may be included):

| | | |
|---|---|---|
| OVHProtVer: | protver | ;; protocol version |
| OVGuid: | GUID | ;; GUID |
| OVRVInfo: | Rendezvous Info | ;;rendezvous instructions |
| OVDeviceInfo: | tstr | ;; DeviceInfo |
| OVPubKey: | PublicKey, | ;; mfg public key |
| OVDevCertChainHash: | OVDevCertChainHashORNull | |

The device is shipped to the owner/user/device deployer 130, and the ownership voucher 120 is transmitted or sent to the owner/user/device deployer 130.

The next step or phase (132) involves the device owner 130 sending the ownership voucher 120 to a cloud/platform 135, which may include an ownership service 140 that stores the ownership voucher 120. The ownership service 140 registers 134 the ownership voucher 120 with a rendezvous server or service (RV), which acts like a DNS (domain name system) service.

User deployment of the device is the next major phase, which involves the user connecting the device to a network. Following boot-up, the device 110 contacts the rendezvous service 145 that was programmed into the device 110 during manufacturing. The device 110 identifies (142) itself to the rendezvous service 145. For example, as part of the ownership service registering with the rendezvous service 145 as discussed in the prior paragraph, the rendezvous service 145 may receive the GUID 144 for the device 110. The rendezvous service 145, seeing the device in its list of GUID, matches the device to its target cloud/platform and provides an address for the target cloud/platform 135 (or which may be the ownership service 140) to the device 110. It should be noted that a device may be configured to contact any of a plurality of rendezvous servers, including on-premise and/or cloud rendezvous services.

Based on the information provided by the rendezvous service 145, the device contacts the cloud/platform (e.g., cloud 135 or ownership service 140). The ownership service 140 and the device 110 perform mutual attestations to confirm the validity of each other. For example, the device uniquely identifies itself to the cloud/platform, and the cloud/platform use the ownership voucher to confirm its validity to the device.

Following successful mutual attestations, a secured, encrypted tunnel may be created between the device and the cloud/platform. For example, the cloud/platform 135 or 140 may download over the encrypted tunnel one or more credentials or software agents for operating and managing the device.

Note that one benefit of such a process flow is that it allows for "late binding." Late binding allows a user to choose its target cloud or on-premises server late in the supply chain.

Note also that, in the onboarding process flow depicted in FIG. 1, if the device is unable to successfully connect with any of the rendezvous servers that it was initially configured with, the onboarding process becomes blocked and cannot continue as the device does not know how to contact its ownership service/target platform. For example, in the existing Fast IDentify Online Device Onboarding (FDO) secure onboarding mechanism, there are limitations when a device is unable to establish connection to any of the pre-configured RVs. The failure to establish a connection may be due to a number of reasons. One reason why the device may not be able to connect with the RV is because the device may have been pre-configured for a network that is completely different from the network in which it is deployed. Also, the device may be unable to get a network address from the site network. Currently, there are no automated remediation mechanisms to allow a device that is initially unable to complete secure device onboarding without manual intervention to fix the issue and successfully complete the onboarding process.

Thus, the current patent document provides embodiments that address such issues. Embodiments herein comprise a component (which may be referred to hereafter as the facilitator) and a device agent residing in or operating in conjunction with the device. In one or more embodiments, the facilitator acts as an intermediary between a device agent and the owner service. When plugged into the same network as the device, the facilitator helps facilitate discovery and performs a set of steps (embodiment of which are discussed below) to automatically resolve issues that are stopping the device from completing device onboarding. In one or more embodiments, the facilitator establishes at least a minimum trust level between itself and the owner service to retrieve the device ownership voucher header. And, in one or more embodiments, the facilitator establishes at least a minimum trust level between itself and the device using information retrieved from the device, the owner, and the RV in order to configure the device so that it can successfully complete the onboarding process.

Figure 2:
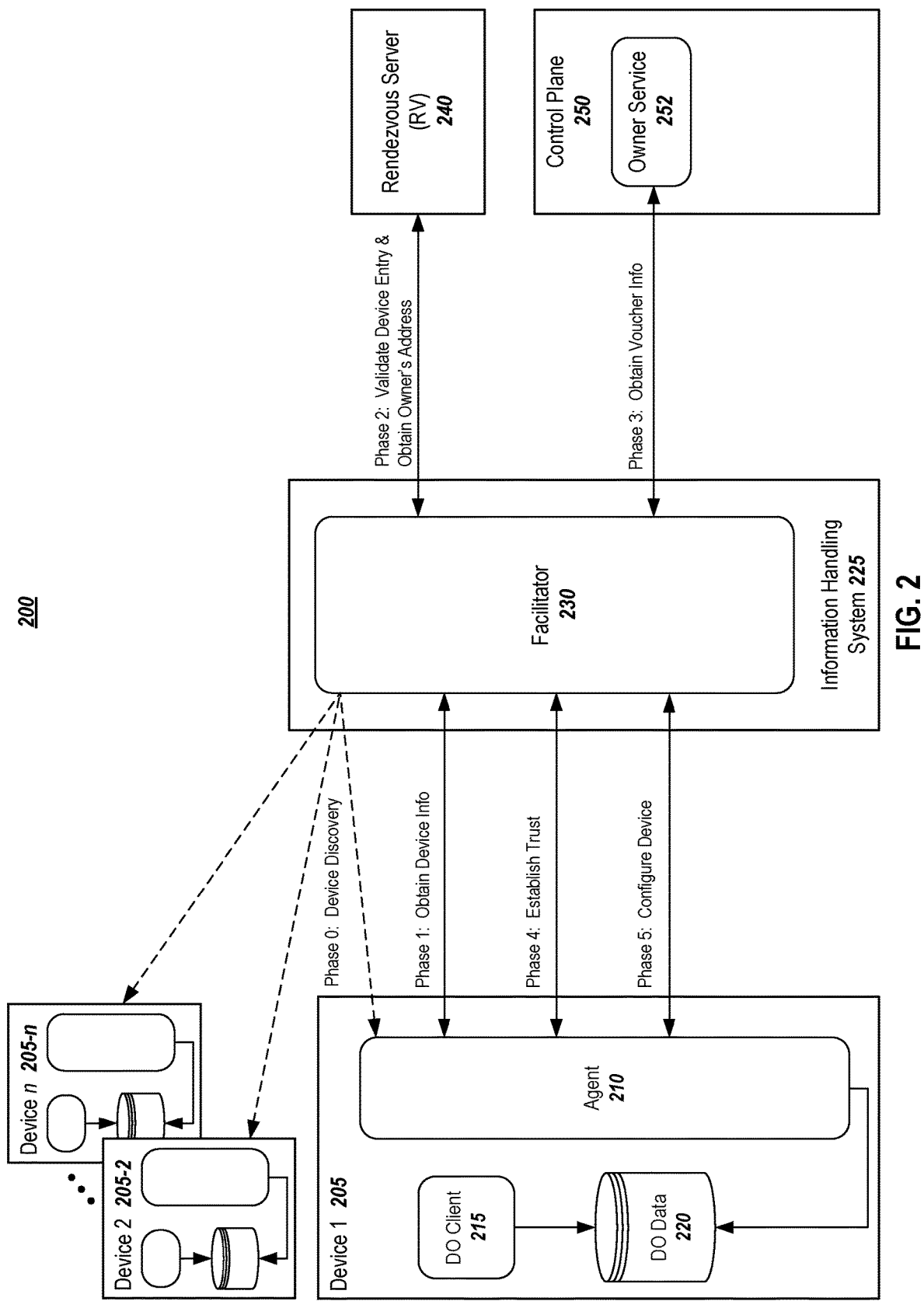
FIG. 2 depicts a high-level overview of a system and methodology for automated remediation of a device that failed device onboarding, according to embodiments of the present disclosure.

B. Embodiments for Automated Remediation of a Device that Failed Secure Device Onboarding FIG. 2 depicts a high-level overview of a system and methodology for automated remediation of a device that failed an onboarding process, according to embodiments of the present disclosure. Depicted in FIG. 2 is a device 205 that has been preconfigured but has experienced some issue or issues stopping it from being able to complete secure device onboarding. The device 205 comprises an agent 210, a secure device onboarding client 215, and memory 220 for storing data used in the secure device onboarding process. Note that the network may comprise a plurality of similarly configured devices (e.g., device 2 (205-2) through device n (205-n)). For simplicity, embodiments will be explained with reference to device 205, although it shall be noted that similar processes may be performed with other devices (e.g., device 205-x).

In one or more embodiments, the agent 210 is configured to communicate with a facilitator 230, which may be a software, firmware, and/or hardware component operating on or in conjunction with an information handling system 225. In one or more embodiments, the facilitator may be an external software running on an information handling system, is trusted, and is securely onboarded with the owner service. As illustrated in FIG. 2, the facilitator is functionally positioned between the device 205 and other components/devices/information handling systems used in secure device onboarding to act as an intermediary. In one or more embodiments, the information handling system on which the facilitator operates has at least two network interfaces-one being directly connected to the device 205, and the other being connected to an external network with connections reachable to a rendezvous server 240 and an owner service 252. Note also that, in one or more embodiments, communications between the device and the facilitator may be via Layer 2 network. Finally, it may be assumed in one or more embodiments that the facilitator is aware of the intended Device Network Configuration (DHCP server, etc.).

In one or more embodiments, the other components/devices/information handling systems used for secure device onboarding may comprise a rendezvous server (RV)

240 and a control plane 250. In one or more embodiments, the control plane 250 may operate in a cloud environment or on an on-premises platform. As illustrated in FIG. 2, the control plane 250 may comprise an owner service 252 that contains information, such as an ownership voucher, used in the secure device onboarding.

Figure 3:
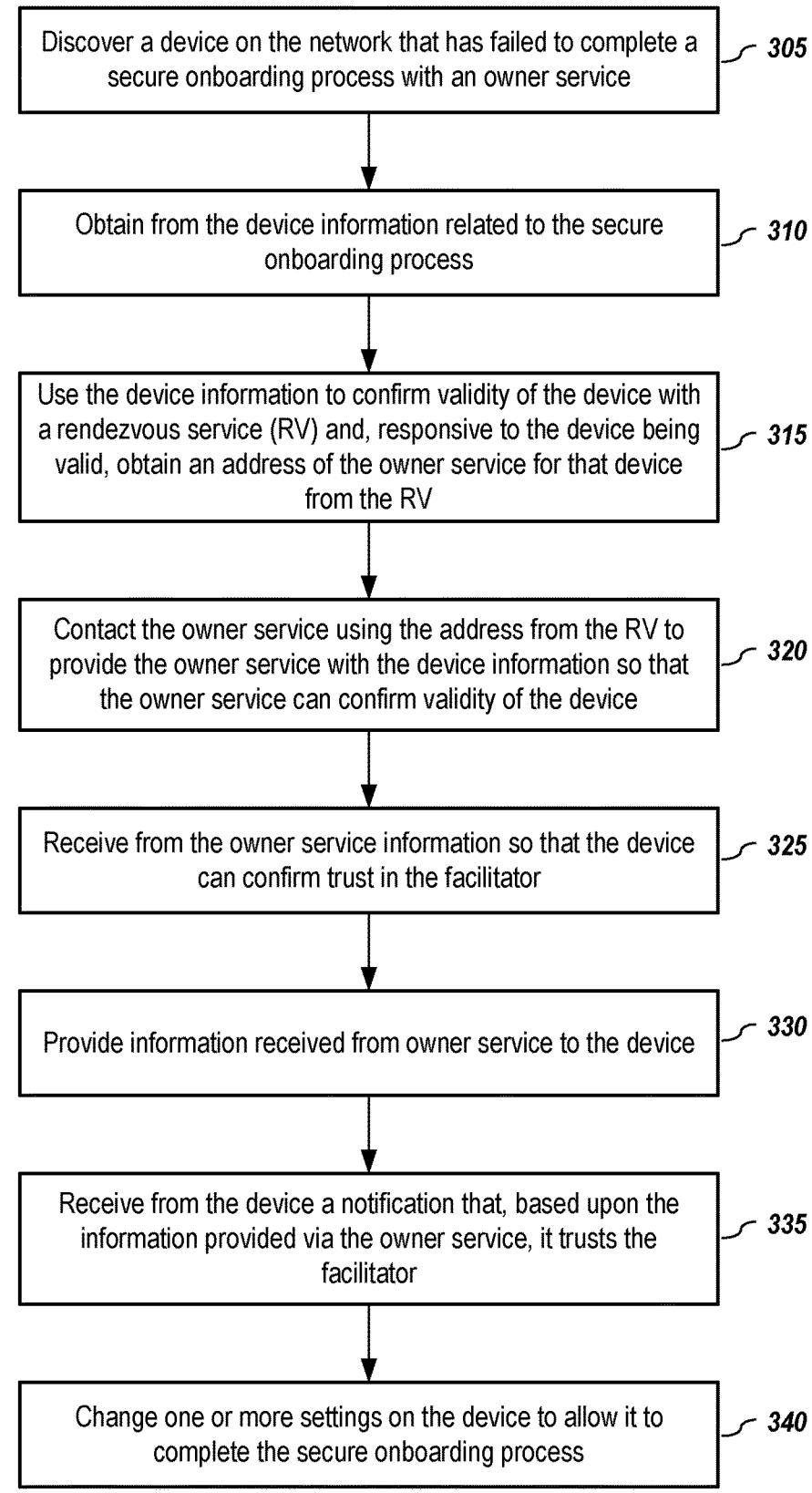
FIG. 3 depicts an overall methodology for automated remediation of a device that failed device onboarding, according to embodiments of the present disclosure.

FIG. 3 depicts an overall methodology for automated remediation of a device that failed secure device onboarding, according to embodiments of the present disclosure. Embodiments of the methodology may be considered in terms of general steps or phases, which correspond to the phases shown in FIG. 2, and are discussed in more detail below. It should be noted that embodiments assume that the secure device onboarding service initialization process, which is done during manufacturing in which a GUID (a globally unique identifier) and a device attestation key (eA) are added to the device, and the steps of registering the ownership voucher with the RV and the owner service were successfully completed.

1. Phase 0: Embodiments of Device Discovery

In one or more embodiments, a device (e.g., device 205) on the network that has failed to complete an onboarding process with an owner service is discovered (305) by a facilitator (e.g., facilitator 230).

Figure 4:
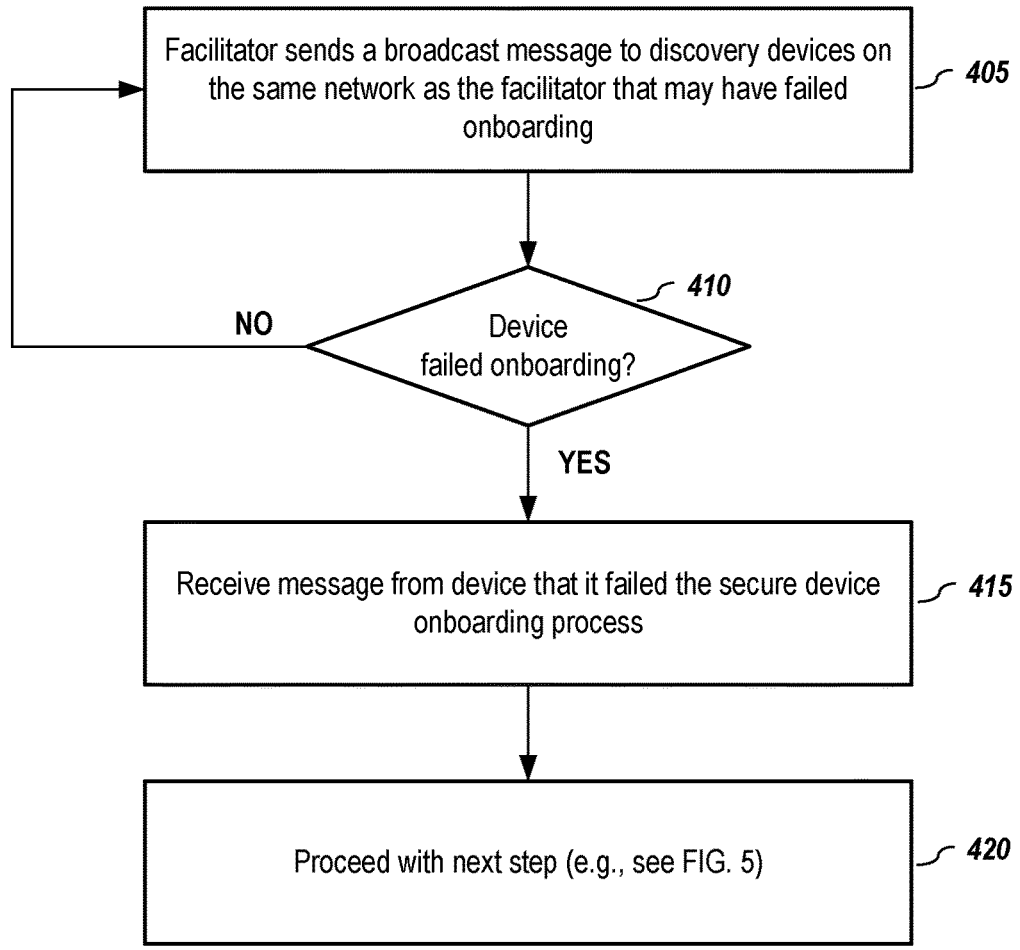
FIG. 4 depicts a methodology for device discovery, according to embodiments of the present disclosure.

FIG. 4 depicts a methodology for device discovery, according to embodiments of the present disclosure. In one or more embodiments, the facilitator 230 sends (405) a broadcast message to discover devices on the same network as the facilitator that may have failed onboarding. In one or more embodiments, the agent (e.g., agent 210) on each device listens for such a message. If a device has not been successful (410) in completing the secure device onboarding process, the facilitator receives (415) a message from the agent indicated that the device's attempt at device onboarding was unsuccessful. For each device that responds that it was unsuccessful at device onboarding, the facilitator proceeds (420) with trying remedy the issue for the device. It shall be noted that, while the discovery process may be performed using a broadcast message, it may also be implemented in other methods including polling or push notifications. For example, if a device fails secure device onboarding, the agent may notify the facilitator.

2. Phase 1: Embodiments of Obtaining Device Information

Figure 5:
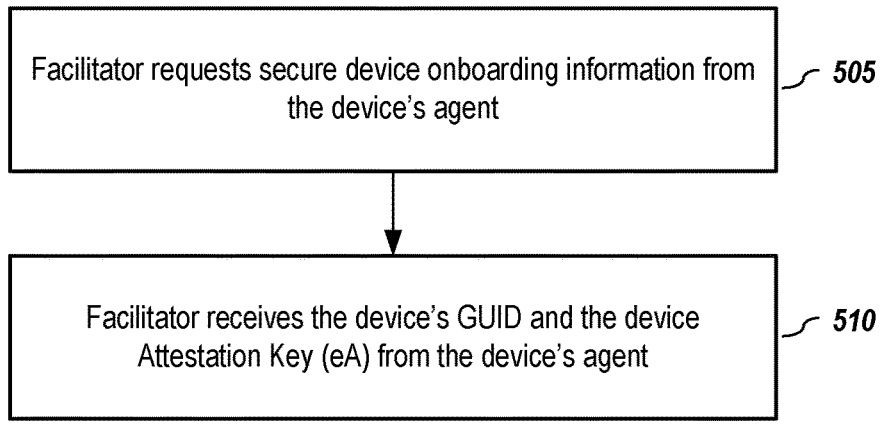
FIG. 5 depicts a methodology for obtaining relevant device information, according to embodiments of the present disclosure.

In one or more embodiments, for each device that failed secure device onboarding, the facilitator obtains (310) information from the device related to the secure onboarding process. FIG. 5 depicts a methodology for obtaining relevant device information, according to embodiments of the present disclosure.

As illustrated in FIG. 5, in one or more embodiments, the facilitator 230 requests (505) the agent of the device to provide the device information that is relevant for device onboarding. In one or more embodiments, this information is the device's GUID and Attestation Key (eA), which were provided or generated as part of the device's initial configuration/manufacture. The agent 210 obtains the information from the device onboarding (DO) data store 220 or from the DO client 215 and returns that information to the facilitator. In one or more embodiments, the facilitator receives (510) the device's GUID and Attestation Key (eA), which it uses later in the methodology.

Figure 6:
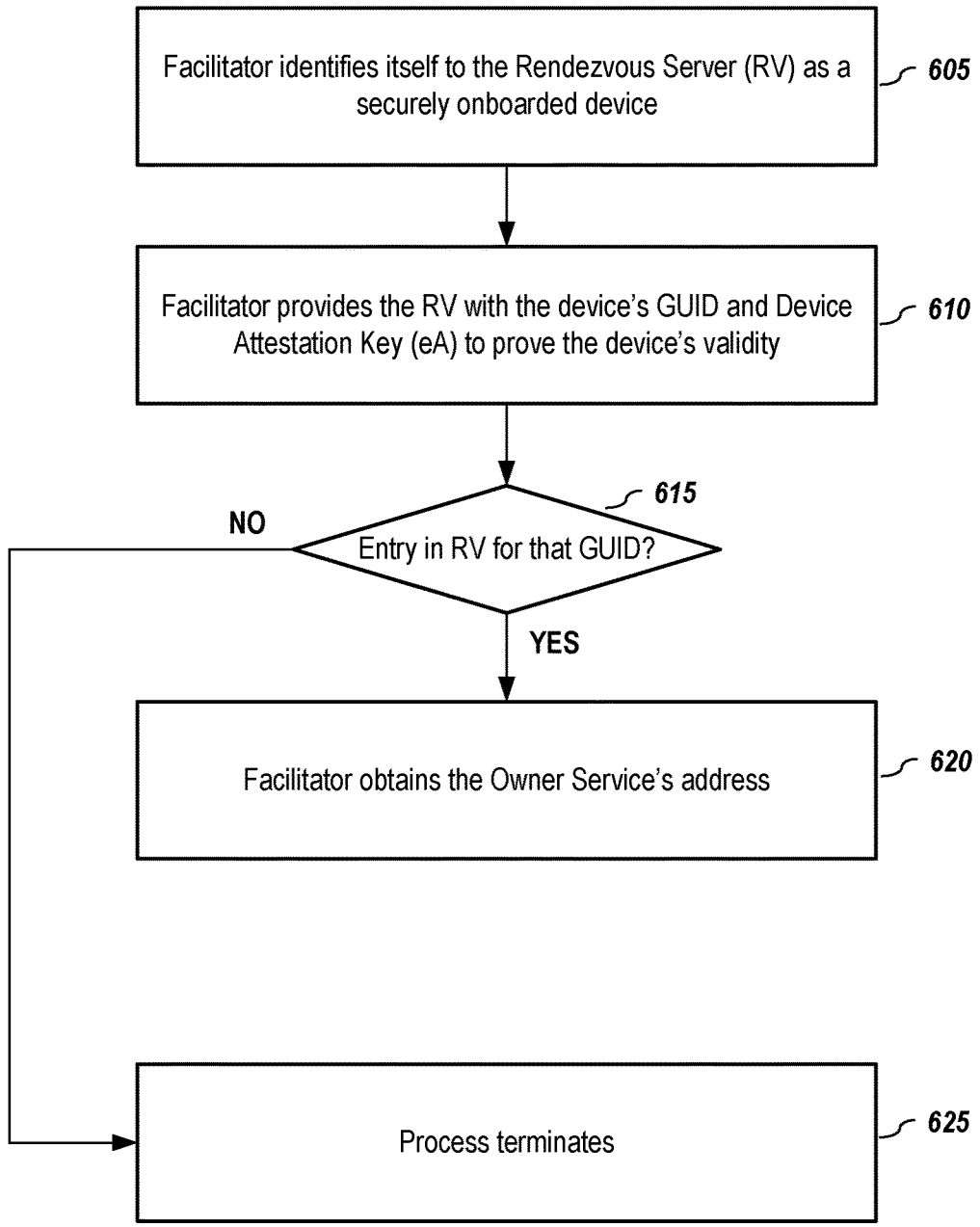
FIG. 6 depicts a methodology for validating the device and for obtaining owner information, according to embodiments of the present disclosure.

3. Phase 2: Embodiments of Validating Device Entry & Obtaining Owner Information In one or more embodiments, the facilitator uses (315) the device information to confirm validity of the device with a rendezvous service (RV) (e.g., RV 240); and, responsive to the device being valid, the facilitator obtains (315) an address, such as an IP address, of the owner service (e.g., owner service 252) for that device from the RV. FIG. 6 depicts a methodology for validating the device and for obtaining owner information, according to embodiments of the present disclosure.

As illustrated in FIG. 6, the facilitator may identify (605) itself to the rendezvous server (RV) (e.g., RV 240) as a securely onboarded device. In one or more embodiments, the facilitator provides (610) the RV with the device's GUID and the device's Attestation Key (eA) to prove the device's validity. As noted above, it is assumed that the registration process, sometimes referred to as the TOO process, has occurred in which the owner service (e.g., owner service 252) registered the ownership voucher with a rendezvous server or service. If the device is a valid device, the RV will have an entry in its list of devices with the GUID of the device. If such an entry exists (615), the RV provides (620) the facilitator with the owner service's network address that corresponds to that GUID. However, in one or more embodiments, if the RV does not have that GUID in its listing, the RV may notify the facilitator of this fact, and the process may terminate (625).

4. Phase 3: Embodiments of Obtaining Voucher Information

Figure 7:
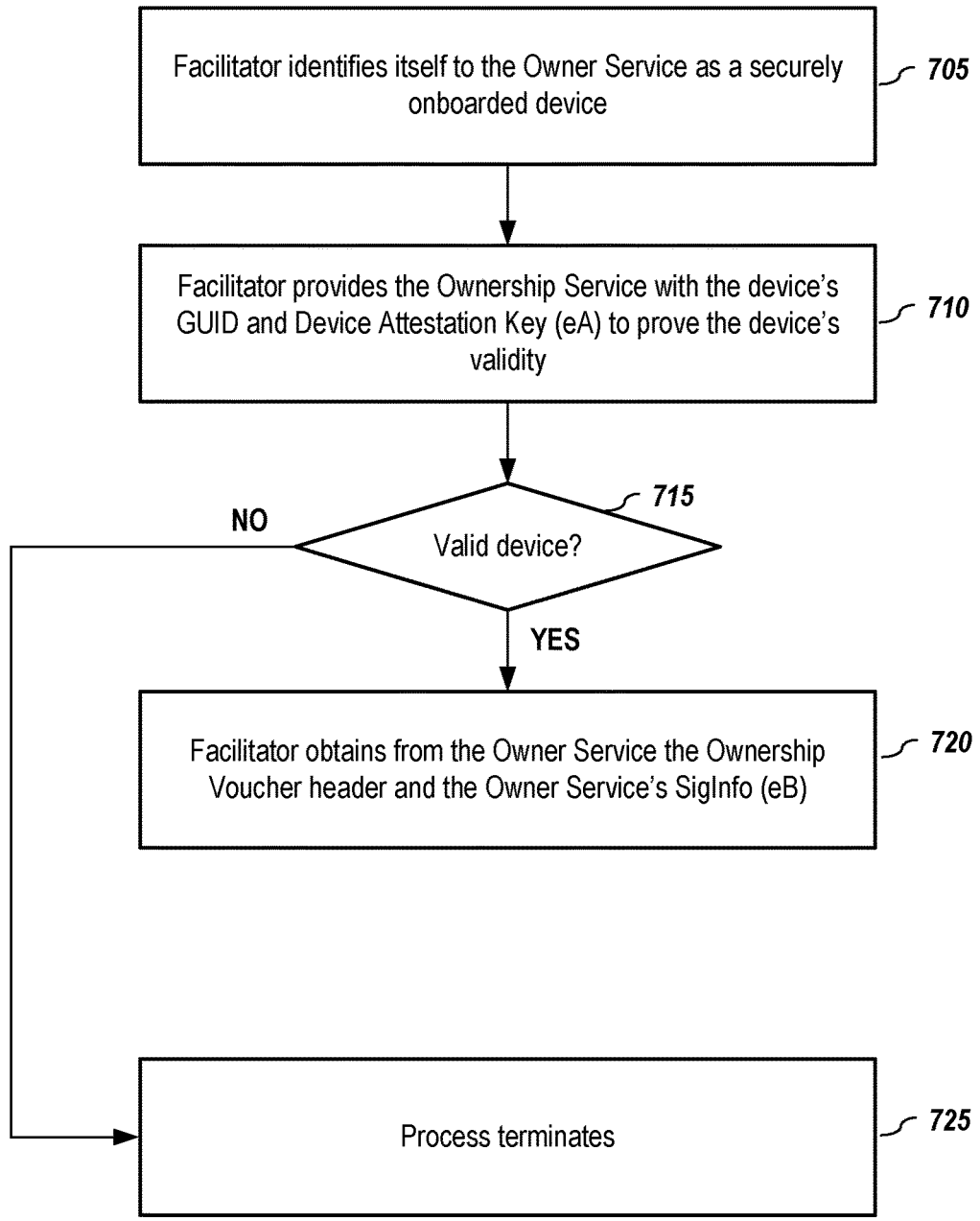
FIG. 7 depicts a methodology for obtaining ownership information (e.g., ownership voucher), according to embodiments of the present disclosure.

Returning to FIG. 3, in one or more embodiments, the facilitator contacts (320) the owner service (e.g., owner service 252) using the address received from the RV to provide the owner service with the device information. The owner service uses the device information provided by the facilitator to validate the device. If the device information is validated, the owner service sends (325) to the facilitator the owner service information that the device may use to confirm trust in the facilitator. FIG. 7 depicts a methodology for obtaining ownership information (e.g., ownership voucher information), according to embodiments of the present disclosure.

As illustrated in FIG. 7, the facilitator may identify (705) itself to the owner service (e.g., owner service 252) as a securely onboarded device. In one or more embodiments, the facilitator provides (710) the ownership service with the device's GUID and the device's Device Attestation Key (eA), which the owner service may use to prove the device's validity. In one or more embodiments, the owner service confirms validity by comparing information supplied by the facilitator with that stored in the ownership voucher.

Responsive to the owner service confirming (715) that the device is valid, the facilitator obtains (720) from the owner service an ownership voucher header and the owner service's certificate (e.g., SigInfo (eB)). However, responsive to the owner service not being able to confirm (715) that the device is valid, the process may terminate (720).

5. Phases 4 & 5: Embodiments of Establishing Trust and Device Configuring

Figure 8:
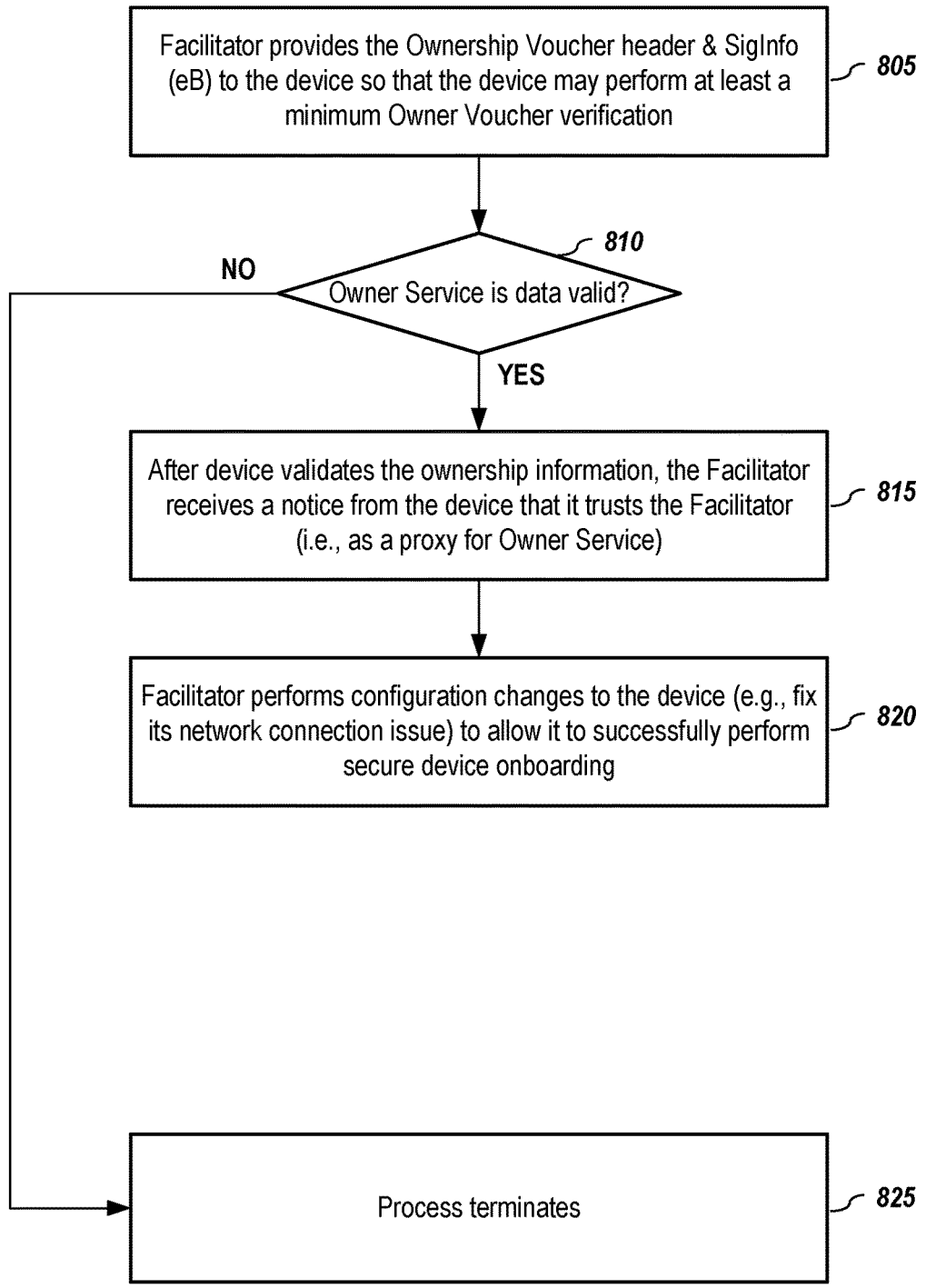
FIG. 8 depicts a methodology for establishing trust and performing device configuration to enable device onboarding, according to embodiments of the present disclosure.

Returning to FIG. 3, in one or more embodiments, the facilitator provides (330) at least some of the owner service information to the device. Responsive to the device confirming the validity of the owner service, the facilitator receives (335) from the device a notification that, based upon the information provided via the owner service, the device trusts the facilitator. With the device trusting the facilitator, the facilitator can change (340) one or more settings on the device to allow it to complete the secure onboarding process. FIG. 8 depicts a methodology for establishing trust and performing device configuration to enable secure device onboarding, according to embodiments of the present disclosure.

As illustrated in FIG. 8, the facilitator provides (805) the ownership voucher header and SigInfo (eB) to the device so that the device may perform at least a minimum verification of the owner.

Responsive to the device validating (810) the ownership information, the facilitator receives (815) a notice from the device that it trusts the facilitator (i.e., the facilitator may act as a proxy for owner service). In one or more embodiments, the facilitator may then make (820) one or more configuration changes to the device (e.g., fix its network connection issue) to allow the device to successfully perform secure device onboarding.

Responsive to the device not being able to validate (810) the ownership information, the facilitator receives (815) a notice from the device and the process may terminate (825).

It shall be noted that the various confirmations of validity discussed herein (e.g., in FIG. 6-8) help provide security. The interaction for this remediation is termination when there is a failed confirmation so that a rogue device or actor cannot affect the system.

Figure 9:
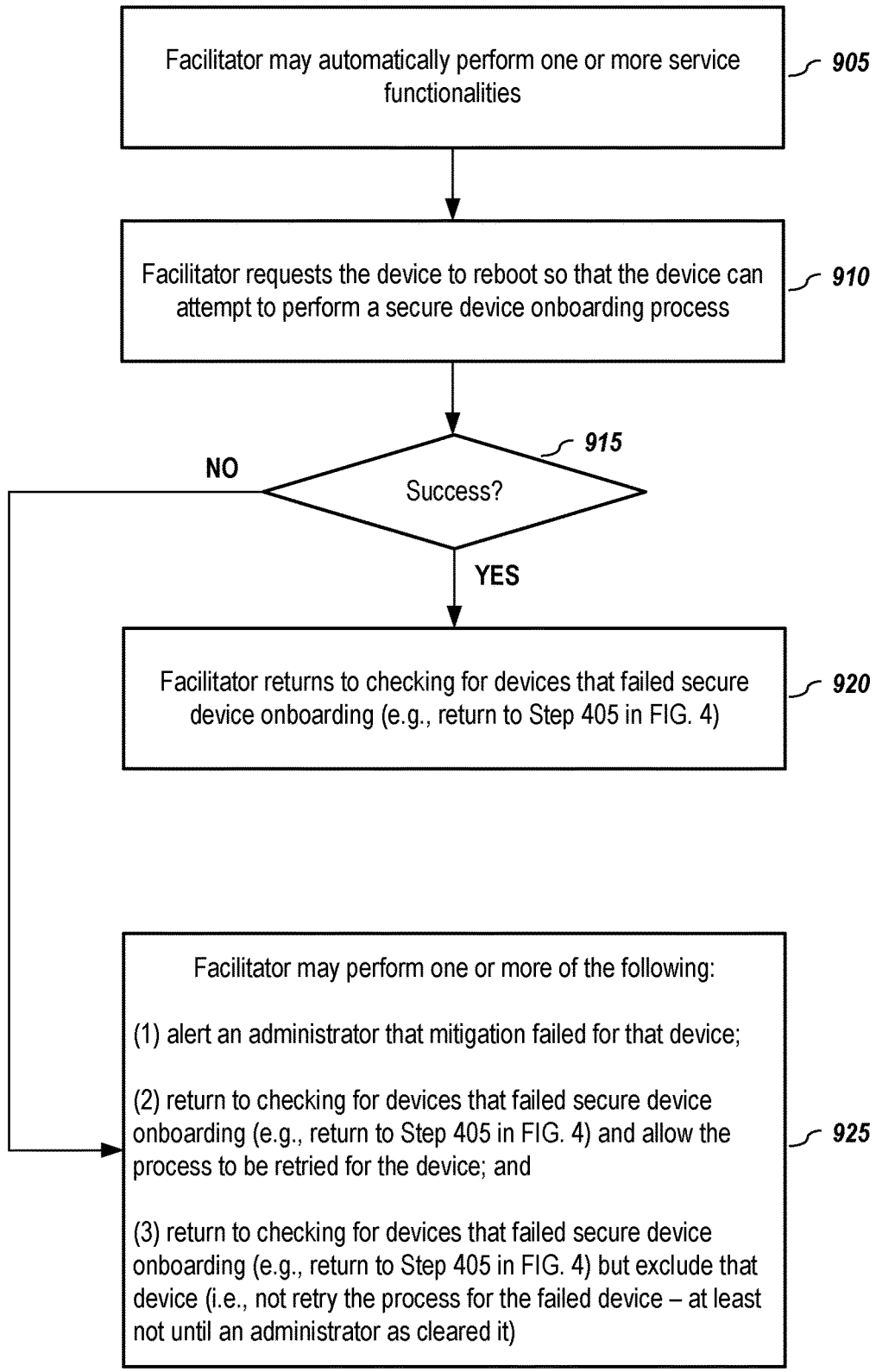
FIG. 9 depicts an alternative methodology for enacting device configuration to enable device onboarding for the device, according to embodiments of the present disclosure.

FIG. 9 depicts an alternative methodology for enacting device configuration to enable device onboarding for the device, according to embodiments of the present disclosure. In one or more embodiments, once the device trusts the facilitator, the facilitator may perform (905) one or more service functionalities. Following the configuration changes, in one or more embodiments, the facilitator may instruct (910) the device to reboot so that the device can attempt to perform a secure device onboarding process.

If the configuration change(s) enabled the device to successfully (915) perform secure device onboarding, in one or more embodiments, the facilitator may return (920) to checking for devices that failed secure device onboarding (e.g., return to Step 405 in FIG. 4).

However, in one or more embodiments, if the configuration changes still failed to enable the device to successfully (915) perform device onboarding, the facilitator may perform one or more of the following:

(1) alert an administrator that mitigation efforts failed for that device;
(2) return to checking for devices that failed secure device onboarding (e.g., return to Step 405 in FIG. 4) and allow the process to be retried for the device; and
(3) return to checking for devices that failed secure device onboarding (e.g., return to Step 405 in FIG. 4) but exclude that device (i.e., not retry the process for the failed device—at least not until an administrator as cleared it).

6. Additional and/or Alternative Embodiments a. Facilitator Proxy Embodiments

Figure 10:
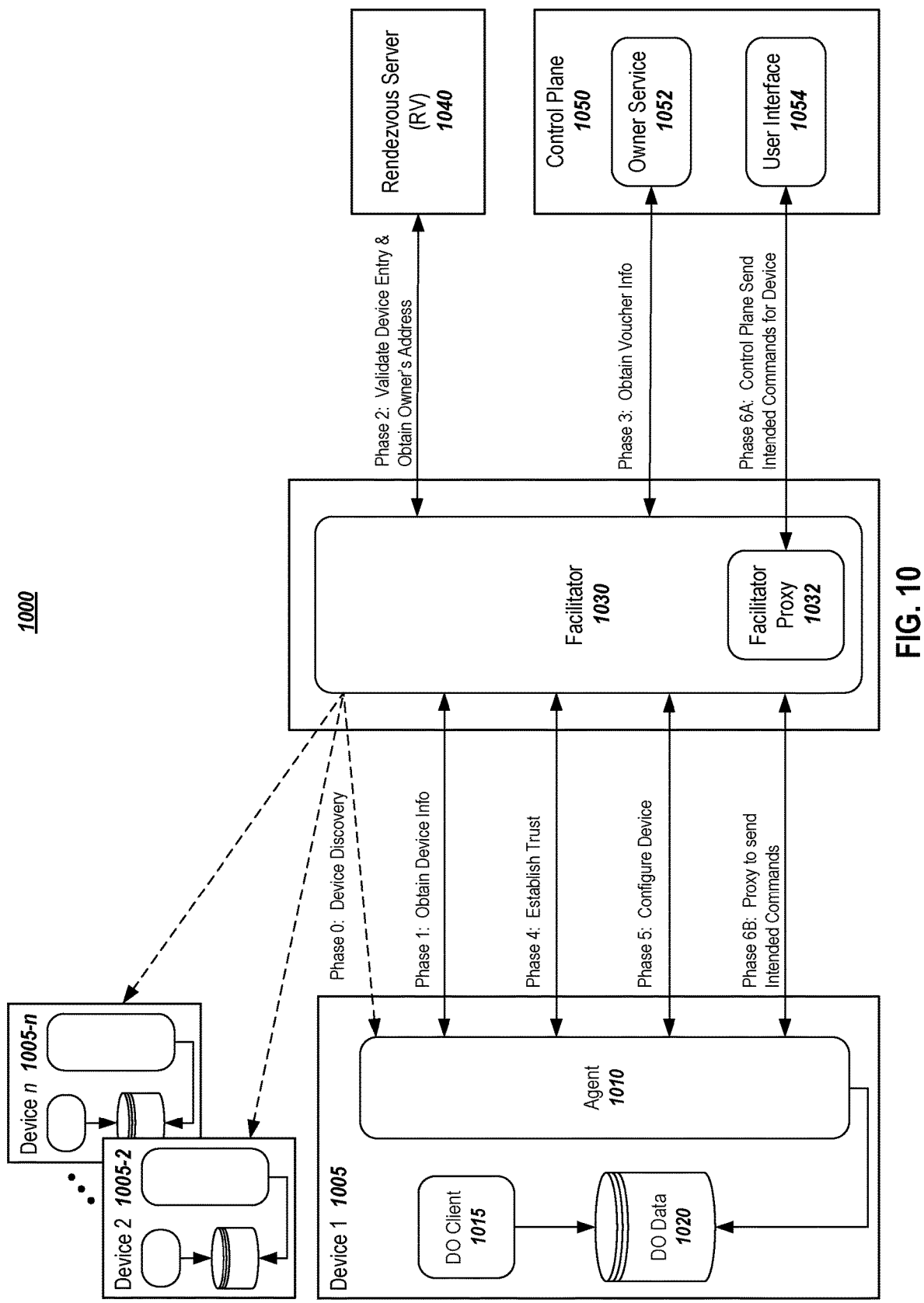
FIG. 10 depicts a high-level overview of alternative systems and methodologies for automated remediation of a device that failed device onboarding, according to embodiments of the present disclosure.

It shall be noted that different configurations may be employed to effect remediation of device issues. FIG. 10 depicts a high-level overview of alternative systems and methodologies for automated remediation of a device that failed device onboarding, according to embodiments of the present disclosure. The system 1000 depicted in FIG. 10 is similar to that depicted in FIG. 2; however, the system of FIG. 10 includes a user interface 1050 that interfaces with a facilitator proxy component 1032 of the facilitator 1030. In one or more embodiments, the user interface 1050 may be located within the control plane 1050 or may be implemented elsewhere.

The user interface and facilitator proxy provide a mechanism by which the remediation process(es) may be performed through the user interface. In addition to creating another entry point for making changes to the device, this proxy mechanism allows technicians to perform remote device servicing, if desired or needed.

It should be noted that phase 6A & 6B of FIG. 10 may replace Phase 5 or may be in addition to Phase 5. Thus, remediation may be performed automatically, manually, or both. For example, if automated remediation fails to fix the problem and the device still cannot complete device onboarding, one skilled in this area will also recognize that the embodiment depicted in FIG. 10 allows a user ready access to intervene to diagnose and fix the issue.

b. Agent Embodiments

It shall be noted that much of the discussion above was from the point of view of the facilitator. However, it should be noted that embodiments also may be viewed from the point of view of the device or an agent of a device. For example, embodiments of computer-implemented methodology for facilitating onboarding of a device of a network may comprises the following steps: from a device that has failed to successfully complete an onboarding process with an owner service, sending device information to a facilitator operating on an information handling system on a same network as the device, in which the facilitator uses at least some of the device information to obtain an address of the owner service from a rendezvous service (RV) and ownership proof information from the owner service; receiving, from the facilitator, the ownership proof information; using at least some of the ownership proof information to confirm validity of the owner service; sending, from the device following its confirmation of validity of the owner service to the facilitator, an indication that the device trusts the facilitator; receiving one or more changes from the facilitator to enable the device to complete the onboarding process; and retrying the onboarding process following implementation of the one or more changes that were received from the facilitator. In one or more embodiments, the device information may comprise a unique identifier and a trust identifier and the ownership proof information may comprise an ownership voucher header and an owner service trust identifier.

In one or more embodiments, the device may send its device information to the facilitator in response to failing to successfully complete the onboarding process (e.g., push notification), or after failing to successfully complete the onboarding process and in response to receiving a message from the facilitator to discovery if the device failed to successfully complete the onboarding process (e.g., pull notification).

In one or more embodiments, the device may terminate this interaction with the facilitator if the confirmation of validity of the owner service fails. Such action stops the device from having its configuration changed by a potentially rogue network element.

Note also, that embodiments in which the facilitator comprises a facilitator proxy, the device may receive, via the facilitator, one or more commands or settings sent by a user to effect remediation of the onboarding process for the device.

Finally, if the re-tried attempt to complete the onboarding process fails too, the device may repeat the process with the facilitator, may notify the facilitator and/or a user (or administrator), or both.

C. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 11:
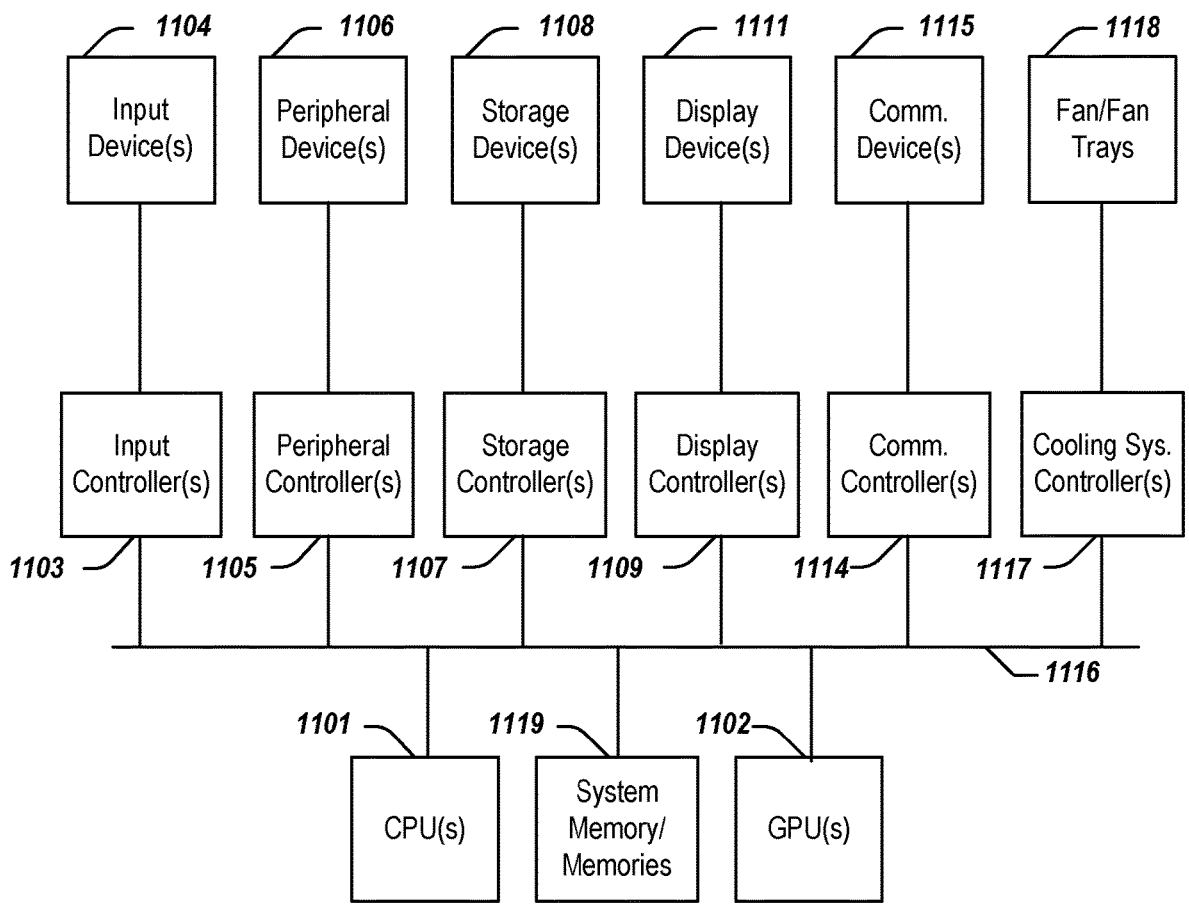
FIG. 11 depicts a simplified block diagram of an information handling system, according to embodiments of the present disclosure.

FIG. 11 depicts a simplified block diagram of an information handling system (or computing system), according to embodiments of the present disclosure. It will be understood that the functionalities shown for system 1100 may operate to support various embodiments of a computing system—although it shall be understood that a computing system may be differently configured and include different components, including having fewer or more components as depicted in FIG. 11.

As illustrated in FIG. 11, the computing system 1100 includes one or more CPUs 1101 that provides computing resources and controls the computer. CPU 1101 may be implemented with a microprocessor or the like and may also include one or more graphics processing units (GPU) 1102 and/or a floating-point coprocessor for mathematical computations. In one or more embodiments, one or more GPUs 1102 may be incorporated within the display controller 1109, such as part of a graphics card or cards. The system 1100 may also include a system memory 1119, which may comprise RAM, ROM, or both.

A number of controllers and peripheral devices may also be provided, as shown in FIG. 11. An input controller 1103 represents an interface to various input device(s) 1104, such as a keyboard, mouse, touchscreen, stylus, microphone, camera, trackpad, display, etc. The computing system 1100 may also include a storage controller 1107 for interfacing with one or more storage devices 1108 each of which includes a storage medium such as magnetic tape or disk, or an optical medium that might be used to record programs of instructions for operating systems, utilities, and applications, which may include embodiments of programs that implement various aspects of the present disclosure. Storage device(s) 1108 may also be used to store processed data or data to be processed in accordance with the disclosure. The system 1100 may also include a display controller 1109 for providing an interface to a display device 1111, which may be a cathode ray tube (CRT) display, a thin film transistor (TFT) display, organic light-emitting diode, electroluminescent panel, plasma panel, or any other type of display. The computing system 1100 may also include one or more peripheral controllers or interfaces 1105 for one or more peripherals 1106. Examples of peripherals may include one or more printers, scanners, input devices, output devices, sensors, and the like. A communications controller 1114 may interface with one or more communication devices 1115, which enables the system 1100 to connect to remote devices through any of a variety of networks including the Internet, a cloud resource (e.g., an Ethernet cloud, a Fibre Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 1100 comprises one or more fans or fan trays 1118 and a cooling subsystem controller or controllers 1117 that monitors thermal temperature(s) of the system 1100 (or components thereof) and operates the fans/fan trays 1118 to help regulate the temperature.

In the illustrated system, all major system components may connect to a bus 1116, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 12:
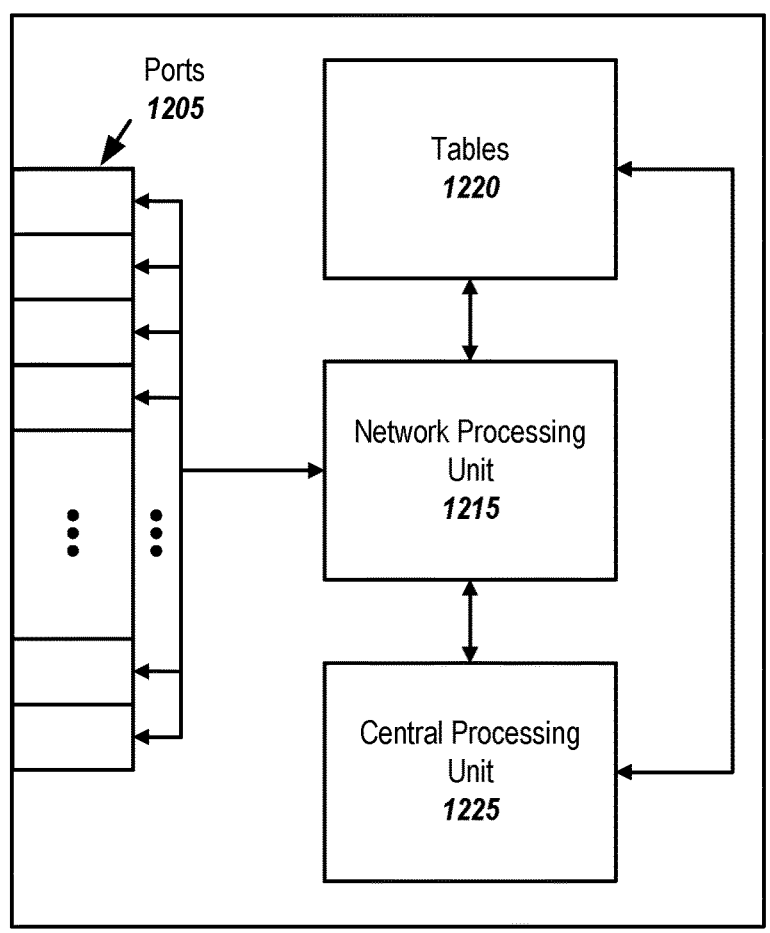
FIG. 12 depicts an alternative block diagram of an information handling system, according to embodiments of the present disclosure.

FIG. 12 depicts an alternative block diagram of an information handling system, according to embodiments of the present disclosure. It will be understood that the functionalities shown for system 1200 may operate to support various embodiments of the present disclosure although it shall be understood that such system may be differently configured and include different components, additional components, or fewer components.

The information handling system 1200 may include a plurality of I/O ports 1205, a network processing unit (NPU) 1215, one or more tables 1220, and a CPU 1225. The system includes a power supply (not shown) and may also include other components, which are not shown for sake of simplicity.

In one or more embodiments, the I/O ports 1205 may be connected via one or more cables to one or more other network devices or clients. The network processing unit 1215 may use information included in the network data received at the node 1200, as well as information stored in the tables 1220, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for facilitating onboarding of a device added to a network, the method comprising:
   receiving, at a facilitator, device information of a device on a same network as the facilitator has failed to successfully complete an onboarding process with an owner service;
   sending at least some of the received device information to a rendezvous server (RV) to enable the RV to confirm validity of the device;
   receiving, from the RV following its confirmation of validity of the device, an address of the owner service from the RV for the device;
   sending to the owner service, using the address received from the RV, at least some of the received device information to enable the owner service to confirm validity of the device;
   receiving, from the owner service following its confirmation of validity of the device, ownership proof information related to the device;
   sending to the device at least some of the ownership proof information to enable the device to confirm validity of the owner service;
   receiving, from the device following confirmation of validity of the owner service by the device, an indication that the device trusts the facilitator; and
   responsive to the indication that the device trusts the facilitator, changing one or more settings on the device to enable the device to complete the onboarding process.

2. The computer-implemented method of claim 1 wherein the facilitator operates on an information handling system that has been trusted and onboarded with the owner service.

3. The computer-implemented method of claim 1 wherein the device information comprises a unique identifier and a trust identifier and the ownership proof information comprises an ownership voucher header and an owner service trust identifier.

4. The computer-implemented method of claim 1 wherein the facilitator communicates with an agent operating on the device.

5. The computer-implemented method of claim 4 further comprising:
   discovering that the device on the same network as the facilitator has failed to successfully complete the onboarding process with the owner service.

6. The computer-implemented method of claim 5 wherein the step of discovering that the device on the same network as the facilitator has failed to successfully complete the onboarding process with the owner service comprises:
   sending, from the facilitator to each agent of a device from a set of devices on the same network as the facilitator, a message to discover any devices from the set of devices that have failed to successfully complete the onboarding process with the owner service.

7. The computer-implemented method of claim 1 further comprising:
   responsive to one of the confirmations of validity failing, terminating this interaction with the facilitator.

8. The computer-implemented method of claim 1 further comprising:

receiving, at the facilitator, one or more commands or settings sent by a user to effect remediation of the onboarding process for the device; and
sending the one or more commands or settings to the device.

9. A computer-implemented method for facilitating onboarding of a device added to a network, the method comprising:
from a device that has failed to successfully complete an onboarding process with an owner service, sending device information to a facilitator operating on an information handling system on a same network as the device, in which the facilitator uses at least some of the device information to obtain an address of the owner service from a rendezvous service (RV) and ownership proof information from the owner service;
receiving, from the facilitator, the ownership proof information;
using at least some of the received ownership proof information to confirm validity of the owner service;
sending, from the device following confirmation by the device of validity of the owner service to the facilitator, an indication that the device trusts the facilitator;
responsive to the confirmation, receiving one or more changes from the facilitator to enable the device to complete the onboarding process; and
retrying the onboarding process following implementation of the one or more changes that were received from the facilitator.

10. The computer-implemented method of claim 9 wherein the device information comprises a unique identifier and a trust identifier and the ownership proof information comprises an ownership voucher header and an owner service trust identifier.

11. The computer-implemented method of claim 9 wherein an agent operating on the device interfaces with the facilitator.

12. The computer-implemented method of claim 9 wherein the device sends its device information to the facilitator:
in response to failing to successfully complete the onboarding process; or
after failing to successfully complete the onboarding process and in response to receiving a message from the facilitator to discover if the device failed to successfully complete the onboarding process.

13. The computer-implemented method of claim 9 further comprising:
responsive to the confirmation of validity of the owner service failing, terminating this interaction with the facilitator.

14. The computer-implemented method of claim 9 further comprising:
receiving, via the facilitator, one or more commands or settings sent by a user to effect remediation of the onboarding process for the device.

15. An information handling system comprising:
one or more processors;
a first interface for communicatively connecting to a device on a same network as the information handling system;
at least one additional interface for communicatively connecting to a network or networks for interfacing with a rendezvous service (RV) and an owner service; and
a non-transitory computer-readable medium or media comprising one or more sets of instructions which, when executed by at least one of the one or more processors, causes steps to be performed comprising:
receiving, at a facilitator, device information of a device on a same network as the facilitator has failed to successfully complete an onboarding process with an owner service;
sending at least some of the device information to a rendezvous server (RV) to enable the RV to confirm validity of the device;
receiving, from the RV following its confirmation of validity of the device, an address of the owner service from the RV for the device;
sending to the owner service, using the address received from the RV, at least some of the device information to enable the owner service to confirm validity of the device;
receiving, from the owner service following confirmation of validity of the device by the owner service, ownership proof information related to the device;
sending to the device at least some of the ownership proof information to enable the device to confirm validity of the owner service;
receiving, from the device following confirmation of validity of the owner service by the device, an indication that the device trusts the facilitator; and
changing one or more settings on the device to enable the device to complete the onboarding process.

16. The information handling system of claim 15 wherein the device information comprises a unique identifier and a trust identifier and the ownership proof information comprises an ownership voucher header and an owner service trust identifier.

17. The information handling system of claim 15 wherein the facilitator communicates with an agent operating on the device.

18. The information handling system of claim 15 wherein the non-transitory computer-readable medium or media further comprises one or more sets of instructions which, when executed by at least one of the one or more processors, causes steps to be performed comprising:
discovering that the device on the same network as the facilitator has failed to successfully complete the onboarding process with the owner service.

19. The information handling system of claim 18 wherein the step of discovering that the device on the same network as the facilitator has failed to successfully complete the onboarding process with the owner service comprises:
sending, from the facilitator to each device from a set of devices on the same network as the facilitator, a message to discover any devices from the set of devices that have failed to successfully complete the onboarding process with the owner service.

20. The information handling system of claim 15 wherein the non-transitory computer-readable medium or media further comprises one or more sets of instructions which, when executed by at least one of the one or more processors, causes steps to be performed comprising:
receiving, at the facilitator, one or more commands or settings sent by a user to effect remediation of the onboarding process for the device; and
sending the one or more commands or settings to the device.

* * * * *